United States Patent
Bates et al.

(10) Patent No.: US 11,399,472 B2
(45) Date of Patent: Aug. 2, 2022

(54) FODDER MACHINE

(71) Applicants: Steve Bates, Draper, UT (US); Dee Bates, Draper, UT (US)

(72) Inventors: Steve Bates, Draper, UT (US); Dee Bates, Draper, UT (US)

(*) Notice: Subject to any disclaimer, the term of this patent is extended or adjusted under 35 U.S.C. 154(b) by 117 days.

(21) Appl. No.: 16/835,043

(22) Filed: Mar. 30, 2020

(65) Prior Publication Data

US 2020/0305357 A1 Oct. 1, 2020

Related U.S. Application Data

(60) Provisional application No. 62/826,506, filed on Mar. 29, 2019.

(51) Int. Cl.
| | |
|---|---|
| *A01G 9/029* | (2018.01) |
| *A01C 7/20* | (2006.01) |
| *A01G 9/02* | (2018.01) |
| *A01G 9/20* | (2006.01) |
| *A01G 27/00* | (2006.01) |

(52) U.S. Cl.
CPC ............ *A01G 9/0299* (2018.02); *A01C 7/20* (2013.01); *A01G 9/023* (2013.01); *A01G 9/20* (2013.01); *A01G 27/005* (2013.01)

(58) Field of Classification Search
CPC ...... A01G 31/04; A01G 9/0299; A01G 9/023; A01G 9/20; A01G 27/005; A01C 7/20
See application file for complete search history.

(56) References Cited

U.S. PATENT DOCUMENTS

| | | | | |
|---|---|---|---|---|
| 5,073,401 | A * | 12/1991 | Mohr | A01C 1/04 426/658 |
| 9,254,963 | B2 * | 2/2016 | Schroeder | B65G 15/44 |
| 9,630,779 | B2 * | 4/2017 | Kaeb | B65G 15/44 |
| 2003/0101645 | A1 * | 6/2003 | Cole | A01G 31/00 47/61 |
| 2015/0000194 | A1 * | 1/2015 | Meerman | A01G 31/04 47/62 R |
| 2015/0329291 | A1 * | 11/2015 | Stenson | B65G 15/44 |
| 2017/0099791 | A1 * | 4/2017 | Joseph | A01G 31/06 |
| 2018/0352754 | A1 * | 12/2018 | Brusatore | A01G 31/04 |
| 2019/0257106 | A1 * | 8/2019 | Baker | A01G 31/02 |
| 2020/0000011 | A1 * | 1/2020 | Hubner | A01C 7/082 |

FOREIGN PATENT DOCUMENTS

| | | | | |
|---|---|---|---|---|
| CN | 108848789 A | * | 11/2018 | ............ A01C 7/06 |
| JP | 2002297690 A | * | 10/2002 | ............ A01G 9/22 |
| KR | 101321336 B1 | * | 10/2013 | ............ A01G 9/249 |
| WO | WO-2015124307 A1 | * | 8/2015 | ............ A01G 9/023 |
| WO | WO-2016170993 A1 | * | 10/2016 | ............ A01G 9/00 |
| WO | WO-2020172137 A1 | * | 8/2020 | ............ A01G 31/06 |

* cited by examiner

*Primary Examiner* — Peter M Poon
*Assistant Examiner* — Carly W. Lynch
(74) *Attorney, Agent, or Firm* — Superior IP, PLLC; Dustin Call

(57) ABSTRACT

A fodder machine. The fodder machine includes one or more beds. The one or more beds are vertical relative to one another and each of one or more beds is offset to every other bed in both horizontal directions. Each of one or more beds is tilted approximately two degrees from horizontal. The fodder machine also includes one or more belts, where the one or more belts are configured to be a surface for the growth of fodder.

13 Claims, 8 Drawing Sheets

FODDER MACHINE

CROSS-REFERENCE TO RELATED APPLICATIONS

This application claims the benefit of and priority to U.S. Provisional Patent Application Ser. No. 62/826,506 filed on Mar. 29, 2019, which application is incorporated herein by reference in its entirety.

BACKGROUND OF THE INVENTION

The worldwide animal feed industry produced 873 million tons of feed (compound feed equivalent) in 2011, fast approaching 1 billion tons according to the International Feed Industry Federation, with an annual growth rate of about 2%. The use of agricultural land to grow feed rather than human food can be controversial; some types of feed, such as corn (maize), can also serve as human food; those that cannot, such as grassland grass, may be grown on land that can be used for crops consumed by humans. In many cases the production of grass for cattle fodder is a valuable intercrop between crops for human consumption, because it builds the organic matter in the soil. Some agricultural byproducts fed to animals may be considered unsavory by human consumers.

This land usage is becoming more of a problem as the human population grows and becomes more prosperous. The land used for the production of animal fodder cannot be used for growing food for humans. In addition, the transportation of fodder from locations best suited for growing to the location of the animals uses an enormous amount of resources.

However, it is often impractical for large animal operations to grow their own fodder. Both because they don't have enough land and because animals need a constant food supply, regardless of season.

Therefore, there is a need for systems that allow for the production of fodder at any location while requiring a minimum of space. In addition, there is a need for these systems to be as automated as possible for ease of operation and to free user time for other tasks.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a fodder machine. The fodder machine includes one or more beds. The one or more beds are vertical relative to one another and each of one or more beds is offset to every other bed in both horizontal directions. Each of one or more beds is tilted approximately two degrees from horizontal. The fodder machine also includes one or more belts, where the one or more belts are configured to be a surface for the growth of fodder and one or more first rollers, where each of the one or more first rollers is located on a first end of one of the one or more beds and one or more second rollers, where each of the one or more second rollers is located on a second end of each of the one or more beds, where the second end is opposite the first end. Each of the one or more belts is on one of the one or more beds passes over the first roller located on the first end of the bed and the second roller located on the second end of the bed and connects to itself. The fodder machine additionally includes one or more motors, where each of the one or more motors is connected to one of the one or more first rollers, and a seeder, where the seeder is configured to output seed onto each the one or more beds. The fodder machine moreover includes one or more troughs, where each of the one or more troughs is configured to receive all water drainage from one of the one or more beds and a slide configured to receive the grown fodder. The fodder machine also includes a watering system configured to provide water to the surface of each bed and a grow light system configured to provide light to each bed.

Another example embodiment includes a fodder machine. The fodder machine includes one or more beds. The one or more beds are vertical relative to one another and each of one or more beds is offset to every other bed in both horizontal directions. Each of one or more beds is tilted approximately two degrees from horizontal. The fodder machine also includes one or more belts, where the one or more belts are configured to be a surface for the growth of fodder and each include cleats along the belt and one or more first rollers, where each of the one or more first rollers is located on a first end of one of the one or more beds and one or more second rollers, where each of the one or more second rollers is located on a second end of each of the one or more beds, where the second end is opposite the first end. Each of the one or more belts is on one of the one or more beds passes over the first roller located on the first end of the bed and the second roller located on the second end of the bed and connects to itself. The fodder machine additionally includes one or more motors, where each of the one or more motors is connected to one of the one or more first rollers, and a seeder, where the seeder is configured to output seed onto each the one or more beds. The fodder machine moreover includes one or more troughs, where each of the one or more troughs is configured to receive all water drainage from one of the one or more beds and a slide configured to receive the grown fodder. The fodder machine also includes a watering system configured to provide water to the surface of each bed, where the watering system includes a filtration system. The fodder machine further includes a grow light system configured to provide light to each bed and control systems and software. The control systems and software control at least one of the one or more beds, the seeder, the watering system or the grow light system.

Another example embodiment includes a fodder machine. The fodder machine includes one or more beds. The one or more beds are vertical relative to one another and each of one or more beds is offset to every other bed in both horizontal directions. Each of one or more beds is tilted approximately two degrees from horizontal. The fodder machine also includes one or more belts, where the one or more belts are configured to be a surface for the growth of fodder and each include cleats along the belt and one or more first rollers, where each of the one or more first rollers is located on a first end of one of the one or more beds and one or more second rollers, where each of the one or more second rollers is located on a second end of each of the one or more beds, where the second end is opposite the first end. Each of the one or more belts is on one of the one or more beds passes over the first roller located on the first end of the bed and the second roller located on the second end of the bed and connects to itself. The fodder machine additionally includes one or more motors, where each of the one or more motors is connected to one of the one or more first rollers, and a seeder, where the seeder is configured to output seed onto each the one or more beds. The fodder machine moreover includes one or more troughs, where each of the one or more troughs is configured to receive all water drainage from one of the one or more beds and a slide configured to receive the grown fodder. The fodder machine also includes a watering system configured to provide water to the surface of each bed, where the watering system includes a filtration system. The fodder machine further includes a grow light system configured to provide light to each bed and control systems and software. The control systems and software control at least one of the one or more beds, the seeder, the watering system or the grow light system. The fodder machine additionally includes an enclosure. The enclosure includes a fully enclosed space, where the space is configured to receive the other elements of the fodder machine and one or more doors allowing access to the interior of the enclosed space. The enclosure also includes one or more glass panels, where the one or more glass panels allow a user to see into the enclosed space and one or more vents, where the one or more vents are configured to allow air flow between the fully enclosed space and the exterior of the enclosure.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
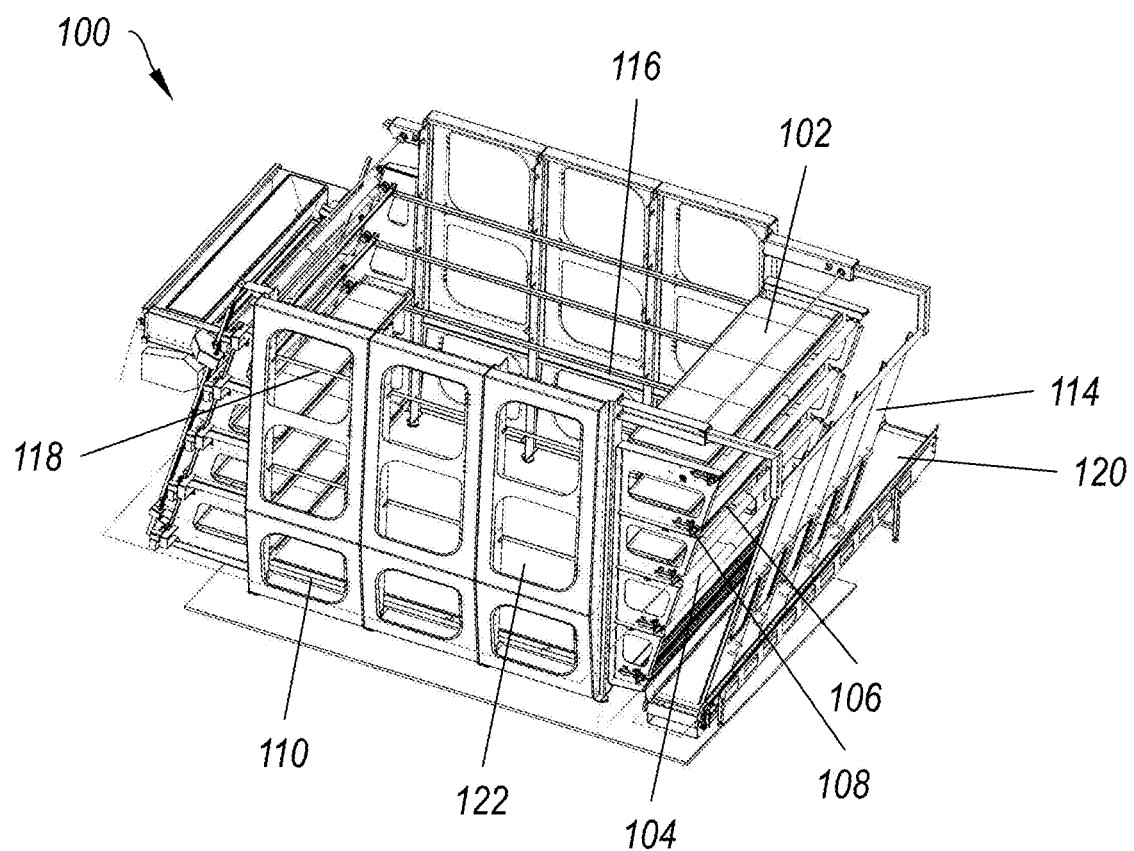
FIG. 1 illustrates an example of a fodder machine.

FIG. 1 illustrates an example of a fodder machine 100. The fodder machine 100 can be used to grow fodder. Fodder, a type of animal feed, is any agricultural foodstuff used specifically to feed domesticated livestock, such as cattle, rabbits, sheep, horses, chickens and pigs. Fodder refers particularly to food given to the animals (including plants cut and carried to them), rather than that which they forage for themselves (called forage). Fodder is also called provender and includes hay, straw, silage, compressed and pelleted feeds, oils and mixed rations, and sprouted grains and legumes (such as bean sprouts, fresh malt, or spent malt) and many other plants. Most animal feed is from plants, but some manufacturers add ingredients to processed feeds that are of animal origin. Thus, the fodder machine 100 allows a user to grow fodder for livestock in a compact area. In addition, the fodder machine 100 can be used to grow other plats, such as herbs, vegetables, grains, other food crops, marijuana, hemp, etc. However, fodder will be used as exemplary of all other plants herein.

FIG. 1 shows that the fodder machine 100 can include one or more beds 102. The beds 102 are vertical "stations" on which the fodder will be grown (only partial beds 102 are shown in FIG. 1 to make viewing other components easier). In particular, the beds 102 each provide a location for the growth of the fodder. Each bed 102 will receive seed, have water and/or nutrients added, have a light source, and have a mechanism for removing the fodder once growth is complete. The beds 102 are stacked such that multiple beds 102 can be placed vertically to allow for better usage of available space. In some cases, the number of beds 102 can reflect the number of days required to grow the fodder. For example, wheat grass can be seeded, sprout and harvested in approximately six days. Thus, the fodder machine 100 can include six beds 102 stacked vertically relative to one another allowing for one bed 102 to be harvested and reseeded each day, providing a reliable amount of fodder production. I.e., six beds 102 allows the user to produce a known amount of wheat grass each day, which is critical to maintain operations and have a reliable food source. The beds 102 can be of any desired width. For example, the beds 102 can be approximately eight feet wide and 15 feet long, which results in a grow area of approximately 120 square feet (720 square feet for six beds). As used in the specification and the claims, the term approximately shall mean that the value is within 10% of the stated value, unless otherwise specified.

Each of the beds 102 is horizontally offset to the other beds 102. This is true in both horizontal directions. I.e., the beds 102 are offset down and left and up and right relative to one another and up and left and down and right relative to one another as shown in the view of FIG. 1. The horizontal offset has numerous benefits. Addition of seed and removal of fodder can occur without interference from adjoining beds 102. In addition, water drainage from one bed 102 does not leak onto lower beds 102, as described below.

Additionally, each bed 102 is tilted by approximately 2 degrees. The tilt is critical to allow for water drainage without causing seed to move down the bed 102. I.e., a tilt of approximately 2 degrees allows water drainage without causing seeds to slide to one side of the bed 102. The tilt of each bed 102 is away from the offset so that any water drainage does not fall onto lower beds 102. In other words, the higher end of each bed 102 is over lower beds 102, but the lowest side of the bed 102 is not above any of the lower beds 102 to facilitate water drainage.

FIG. 1 also shows that the fodder machine 100 can include a belt 104. Each of the belts 104 are able to move along a bed 102 (only partial belts 104 are shown in FIG. 1 to make viewing other components easier). That is, the belt 104 is configured to rest on the bed 102 and be movable along the bed 102. The belts 104 are placed on beds 102, such that the belts 104 can be rotated for the placement of seed, for the removal of fodder or to perform any other desired action, while the bed 102 supports the weight of the belt 104, preventing sagging or damage to the belt 104. I.e., the bed 102 provides structural support for the belt 104, which the belt 104 allows movement of the fodder along the bed 102. As used in the specification and the claims, the phrase "configured to" denotes an actual state of configuration that fundamentally ties recited elements to the physical characteristics of the recited structure. That is, the phrase "configured to" denotes that the element is structurally capable of performing the cited element but need not necessarily be doing so at any given time. Thus, the phrase "configured to" reaches well beyond merely describing functional language or intended use since the phrase actively recites an actual state of configuration.

FIG. 1 further shows that the fodder machine 100 can include a roller 106 on each end of the bed 102. The roller 106 is configured to allow the belt 104 to move along the bed 102. That is, the roller 106 ensures that when the belt 104 reach the end of the bed 102 that the belt 104 is turned upside down and moved toward the front of the bed 102 along the underside of the bed 102. Thus, the path of the belt 104 is oblong. One of skill in the art will appreciate that this means that approximately 50% of the belt 104 is being used to grow fodder at any one time.

One of skill in the art will appreciate that the belt 104 is placed on the bed 102, around a roller 106 on the front end of the bed and a roller 106 on the opposite end of the bed 102 and connected to itself. For example, a roller 106 of approximately four inches diameter can allow the belt 104 to be placed in an oblong pattern, without causing such a drastic bend in the belt 104 that the belt 104 is damaged. The belt 104 can be connected to itself using any desired method, such as a zipper or other mating mechanism.

FIG. 1 additionally shows that the fodder machine 100 can include one or more motors 108. The one or more motors 108 causes rotation of the roller 106, which in turn causes motion of the belt 104. I.e., as long as the belt 104 is sufficiently tight on the rollers (that is, there is no "slack" in the belt 104), then when the motor causes rotation of the roller 106 then the belt 104 is pulled along the bed 102. One of skill in the art will appreciate that "pushing" the belt 104 requires more power than "pulling" the belt 104, thus the motor 108 will be located at the end of the beds 102, rather than at the front in most cases.

FIG. 1 further shows that the fodder machine 100 can include a trough 110 which is configured to receive all water drainage. I.e., a trough 110 can be placed below the lower side of each of the beds 102, so that when water drains off the beds 102, it is all caught in the trough 110. The trough 110 also has a tilt so that all of the drainage water is collected at a single point where it can be recycled or removed.

FIG. 1 additionally shows that the fodder machine 100 can include a seeder 112. The seeder 112 outputs seed at the front of the fodder machine 100 in a regular pattern while the belt 104 is rotating around the bed 102 to cover the desired sections of the belt 104 in seed. I.e., as seed falls from the seeder 112, the belt 104 is moving the bed 102, causing the entire upper surface of the belt 104 to be covered in seed, where it can be grown into fodder. The rate at which seed is distributed by the seeder 112 can vary depending on a number of factors, including seed type. For example, the seeder 112 can be set to plant seed at 30 inches per minute for wheat grass, with the speed adjustable to faster or slower speeds as needed. The seeder 112 includes a hopper for storing the seed and a chute for moving the seed from the hopper to the belt 104, as described below. The seeder 112 can be moved vertically to allow for distribution of seed on each of the beds 102. One of skill in the art will appreciate that the "vertical movement" will also include horizontal movement to allow for accommodation of the offsets of each bed 102; however, for convenience the movement will be referred to as vertical.

FIG. 1 moreover shows that the fodder machine 100 can include a slide 114 at the end of the beds 102 (i.e., opposite the seeder 112). The slide 114 allows the fodder to exit the fodder machine 100. In particular, when the fodder is mature, the belt 104 can rotate such that the fodder all moves toward the end of the machine. As the belt 104 rotates and turns upside down, the fodder falls from the bed 102 onto the slide 114. The fodder then moves down the slide 114 to a collection area. The slope of the slide 114 matches the offset of the beds 102 to allow all fodder to fall the same distance regardless of which bed 102 the fodder was grown on.

FIG. 1 also shows that the fodder machine 100 can include a watering system 116. The watering system 116 provides water to the seeds/fodder on a regular basis to encourage growth. I.e., the water system includes sprinklers or nozzles placed above each of the beds 102 which provide water evenly to the fodder. The nozzles are high precision nozzles which allow the water placement to be controlled to a very high degree. The excess water is collected in the trough 110, discussed above, and recycled to prevent water loss. Because each bed 102 may have fodder in a different state of maturity, the watering system 116 can provide water to each bed 102 independent of the other beds 102. For example, wheatgrass sprouts and reaches a stage where it can be used as feed in approximately six days. Therefore, the top bed 102 (or first bed 102) can be seeded on day one, the second bed 102 on day two, etc. Therefore, the watering system 116 can provide water to only the first bed 102 on day one and can give seedlings less or more water based on the plant needs. So for example, at day six of the cycle, the first bed 102 may not receive any water (to reduce weight as it nears harvest), the third bed 102 may be receiving the maximum amount of water (to maximize growth as seeds have begun sprouting) and the sixth bed 102 may be receiving low amounts of water on a more frequent basis (to encourage the seed to sprout).

The watering system 116 can include a filtration system to recycle water. For example, after belt 104 is rinsed or when water is collected from the trough 110, the water can be run through the filtration system to clean the water before it is run through the watering system 116 and placed back on the fodder. This can prevent contamination from water that is used over and over. In addition, it means that the overall water usage is much lower, limited to only what the plants themselves need and/or absorb.

FIG. 1 moreover shows that the fodder machine 100 can include a grow light system 118. The grow light system 118 provides light to the seedlings, allowing them to photosynthesize and grow. Because the beds 102 are close to one another it is critical that the lights are low heat lights (e.g., LEDs or fluorescent lights). Low heat lights are defined as lights that produce enough light for the plants needs without causing heat damage to the plants. The grow light system 118 can be installed above each bed 102 so that when plants begin to sprout, they are provided with the needed amount of light. In addition, the wavelength of light emitted by the grow light system 118 can be adjusted based on the plant's needs. For example, plants may grow better in one wavelength range when newly sprouted but in a different wavelength range when more mature.

One of skill in the art will appreciate that the grow light system 118 must be waterproof. That is, the ambient moisture that is present because of the watering system 116 present can short out the grow light system 118 unless the grow light system 118 is waterproof. The grow light system 100 can include track lights that are placed perpendicular to the movement of the belt 104. This allows for replacement and repair when needed. I.e., because the beds 102 are longer than they are wide, accessing lights from the side of the beds 102 is easier than accessing lights from the front and end of the beds 102.

The electronics of the fodder machine 100 (e.g., the motor 108, the watering system 116, the grow light system 118, etc.) can be low voltage. The presence of moisture can damage electronics and cause shorts within the electrical systems at regular voltages. Low voltage electronics are safer for the user and are less likely to fail in high moisture environments. In addition, low voltage electronics reduce the operating cost, which is critical in low profit margin industries such as dairy farming. In addition, all electronics can be shielded from moisture. In particular, any control circuitry can include a waterproof housing to protect the control circuitry from moisture.

FIG. 1 also shows that the fodder machine 100 can include one or more conveyor systems 120. The conveyor system 120 transports the fodder after it falls down the slide 114. A conveyor system 120 is a common piece of mechanical handling equipment that moves materials from one location to another. Conveyor systems allow quick and efficient transportation for a wide variety of materials, which make them very popular in the material handling and packaging industries. Many kinds of conveying systems are available and are used according to the various needs of different industries. The conveyor system 120 allows for the loading of the fodder to a feed location. For example, the conveyor system 120 can end in the location where the desired animals will feed. Additionally or alternatively, the conveyor system 100 can transport the fodder to a loading location where it can be placed in a transport vehicle to be taken to a desired location(s). A water pan or other device collects excess water from the conveyor system 120 and returns the water to the filtration system.

FIG. 1 further shows that the fodder machine 100 can include one or more windows 122. The one or more windows 122 allow access to the interior of the fodder machine. I.e., the one or more windows 122 include access panels that can be removed to allow a user to access the interior of the fodder machine 100 when needed. When the windows 122 are in a closed position, the interior of the fodder machine 100 is closed to prevent seed or moisture from escaping.

Multiple fodder machines 100 can be used to increase the production of fodder. For example, multiple fodder machines 100 can be operated in parallel with one another. By way of example, if three fodder machines 100 are operated simultaneously in parallel then one bed 102 of each fodder machine 100 can be seeded per day or three beds 102 on a single fodder machine 100 can be seeded each day.

In addition, the fodder machines 100 can be run in serial. That is, fodder machines 100 can be connected to one another end to end. To connect two fodder machines 100 in serial, the front rollers 106 and seeder 108 of the first fodder machine 100 are removed, the end rollers 106 of the second fodder machine are removed, and the front of the first machine is connected to the end of the second machine. A first belt 104 is then connected to a second belt 104 to form an elongated belt 104. The elongated belt 104 is placed on the bed 102, around a roller 104 on the front end of the first bed and a roller 104 on the opposite end of the second bed 102 and connected to itself. Thus, a single seeder 112 can be used to double the production of fodder. Connecting two fodder machines in serial results in slightly more grow area (because there is a gap between the beds 102 which is now available for growing and because two belts 104 now wrap around only two rollers 106, instead of four rollers 106), which means that the total square footage per bed is 264 square feet). The total square footage for three fodder machines 100 in serial is 396 square feet. In practice, three fodder machines 100 can be connected serially without significant modification; however, once more than three fodder machines 100 are connected serially, the one or more motors 108 can no longer move the weight of the belt 104 and the fodder. I.e., after more than three fodder machines 100 are connected serially, moving the resultant weight becomes exponentially more difficult.

One of skill in the art will appreciate that everything that comes in contact with the fodder, and some other systems as well, will include materials, such as stainless steel, that is approved by the FDA for use in food production. For example, stainless steel is an FDA approved material and can be used for the beds 102. In addition, non-porous materials are preferred to prevent retention of water and inhibit the growth of mold or other contaminants.

Figure 2:
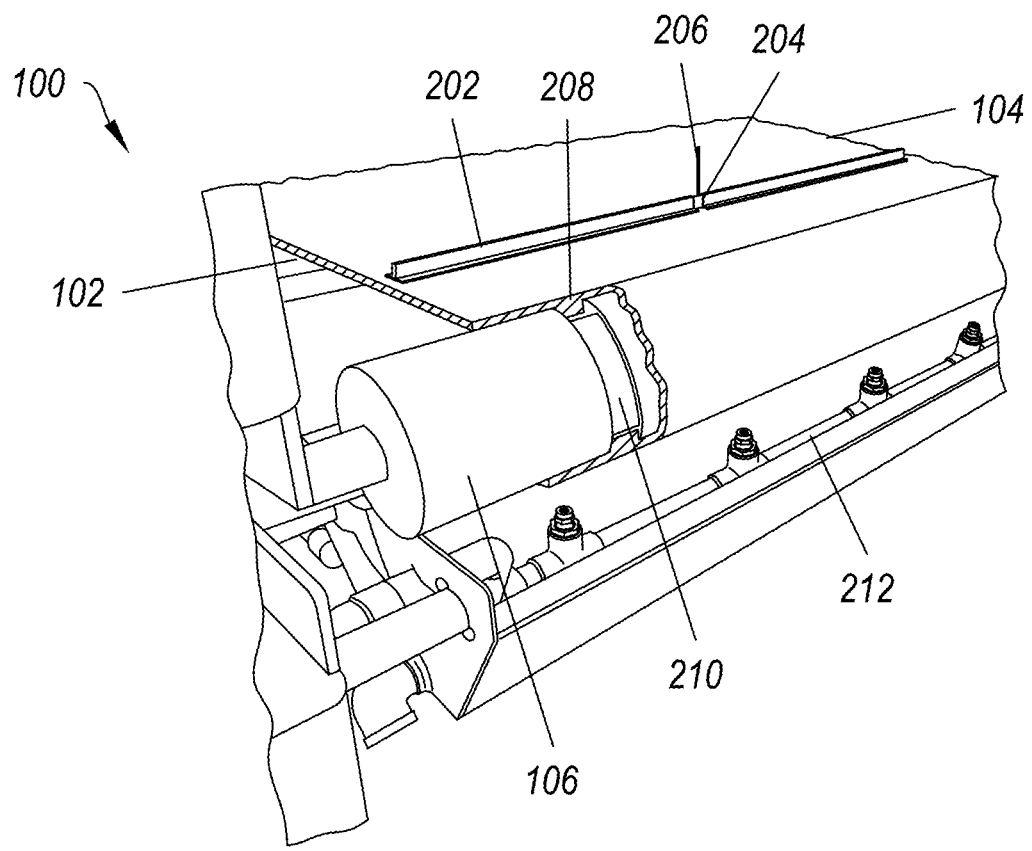
FIG. 2 illustrates a closeup of the end of a bed, showing a belt and roller combination.

FIG. 2 illustrates a closeup of the end of a bed 102, showing a belt 104 and roller 106 combination (the belt is shown partially cut-away to show details which would not otherwise be visible). The belt 104 is waterproof (i.e., non-porous) and flexible. The waterproof surface prevents growth of mold, mildew or other contaminants and ensures that water remains on the surface where it is available to grow fodder and/or that water moves along the surface to be collected for reuse (e.g., the water drains into a trough, such as the trough 110 of FIG. 1). In addition, the fodder is much easier to remove from the belt 104 because the surface is non-porous. In particular, as the belt 104 passes over a roller 106 (so the surface of the belt 104 is inverted) the fodder slides off of the belt (where it can be placed in a collection system, e.g., via the slide 114 of FIG. 1). Finally, the belt 104 is flexible enough that it can pass over a roller 106 or other device without damaging the belt 104.

FIG. 2 shows that the belt 104 can include cleats 202 along the belt 104. The cleats 202 can be placed approximately every foot. The cleats 202 allow fodder to be removed in a manner that is easier for the user, as described below. In particular, the cleats 202 ensure that the pieces of fodder that are being removed are of a size to be handled by the user. I.e., without the cleats 202 the entire top surface of the belt 104 would be a single interconnected section of wheatgrass (wheatgrass is the freshly sprouted first leaves of the common wheat plant). Since, wheatgrass weighs 7-8 pounds per square foot when dry and approximately 10 pounds per square foot when wet, moving a full bed of wheat grass without mechanical means is extremely difficult. Therefore, without cleats 202 the growing wheatgrass would have to be cut into sections that can be handled by a user. Instead, the cleats 202 ensure that the fodder grows in two-foot sections and does not, therefore, need to be cut.

In addition, the cleats 202 ensure more even watering of the fodder. Without cleats, water will tend to pool or collect in certain spots. This is inevitable since nothing can be manufactured perfectly and there must be some unevenness in either the bed or the belt 104. The cleats 202 mean that water can flow only so far and then movement is impeded.

I.e., water placed in one section remains mostly or entirely on that section of the belt 104.

FIG. 2 also shows that the belt 104 includes one or more slots 204 in the cleats 202. The slots 204 allow for further subdivision of the fodder perpendicular to the cleats 202. Additionally cleats 202 would overly constrain water and not allow drainage of excess water. However, no division of fodder perpendicular to the cleats would result in large sections that would have to be cut or would tear when moving, resulting in mess and/or uneven sections of fodder. Thus, the slots 204 create predictably sized easily movable pieces of fodder that can be easily removed from the belt 104.

FIG. 2 further shows that there are paddles 206 which are installed near the belt 104. The paddles 206 are placed on or near the belt 104 such that they will pass through the slots 204. The paddles 206 will clear any seed or growing fodder in a straight line from a slot 204 in a first cleat 202 to a corresponding slot 204 on a second cleat 202. For example, if the slots 202 and paddles 206 are installed at two-foot intervals then the resulting fodder will be one foot by two feet, resulting in fodder which is transportable (this would be approximately 15-20 pounds of wheatgrass). One of skill in the art will appreciate that the paddles 206 can be made of metal, brushes, rubber or any other desired material so long as the paddles 206 produce repeatable breaks in the fodder.

FIG. 2 additionally shows that the belt 104 and roller 106 combination can include a track 208 on the belt 104 that matches to a notch 210 on the roller 106. The track is a protrusion that 208 runs along the entirety of the belt 104 on the side opposite the cleats 202. This ensures that the belt 104 does not drift relative to the roller 106. I.e., if the belt 104 begins to drift more than a fraction of an inch the edge of the track 208 will butt up against the notch 210, prevent any further drift. This is critical because, as noted above, the bed full of fodder is too heavy to manipulate by hand. Thus, having to move the belt 104 to correct for drift would require removing all fodder from the belt 104, loosening the roller 106 to provide slack in the belt 104, moving the belt 104, retightening the belt 104 and then applying seed to the belt 104 and begin the growing process. This could be quite disruptive to the growth process.

FIG. 2 moreover shows that the fodder machine can include a washing system 212 at one or both ends of the bed 102. The washing system 212 can clean the belts 104 after removal of the fodder. In particular, the washing system 212 can include nozzles that rinse the belts 104 at the end immediately after the fodder falls onto the slide 114. I.e., the belt 104 rotates around a roller which causes the fodder to drop from the belt 104. The belt 104 then passes by the washing system 212, with high powered sprays which remove debris from the belt 104. Because of the offset the washing system 104 is not immediately above any fodder, preventing damage to the fodder on the bed 102 below the bed 102 being harvested. Additionally or alternatively, the washing system 212 at the beginning of the beds 102, before the belt 104 is placed in position to receive seed from the seeder 112.

Figure 3A:
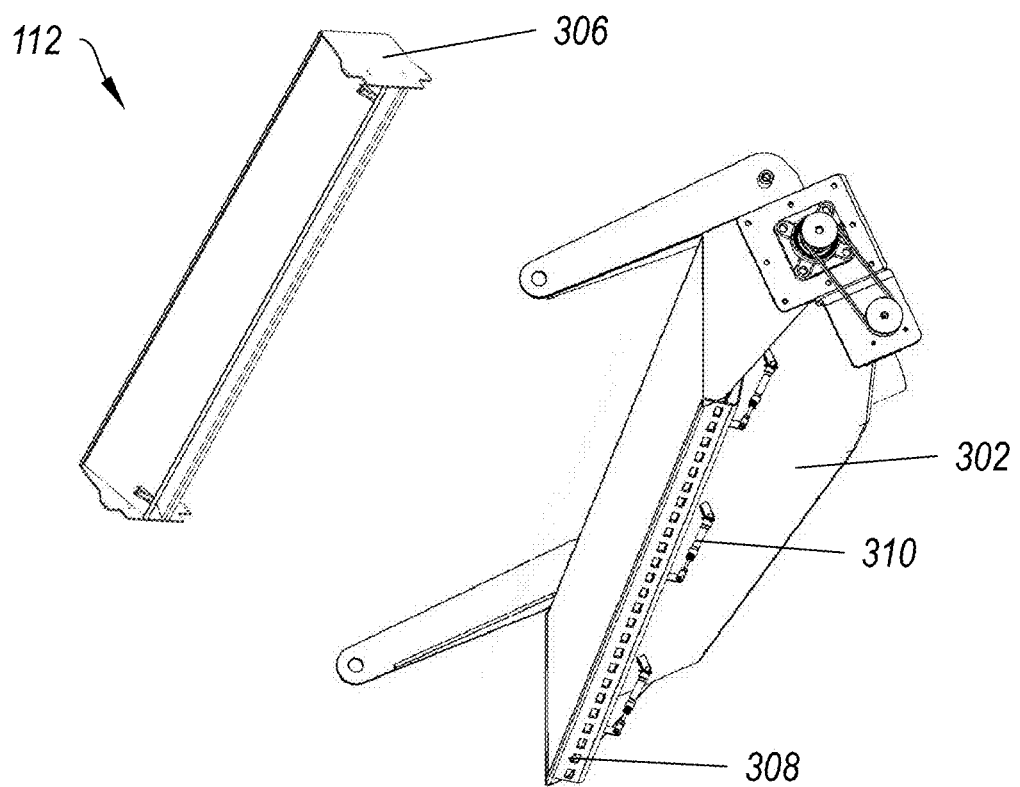
FIG. 3A illustrates a bottom perspective view of the example of a seeder.
Figure 3B:
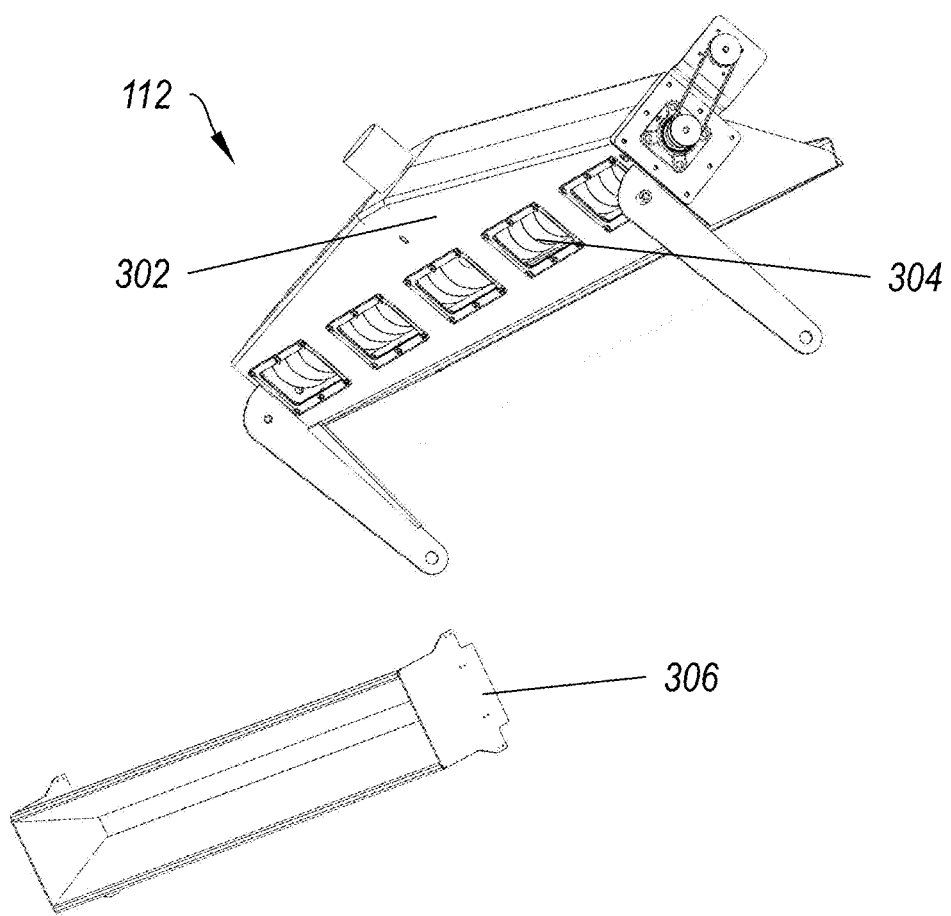
FIG. 3B illustrates a top perspective view of the example of a seeder.

FIGS. 3A and 3B (collectively "FIG. 3") illustrate an exploded view of an example of a seeder 112. FIG. 3A illustrates an exploded bottom perspective view of the example of a seeder 112; and FIG. 3B illustrates an exploded top perspective view of the example of a seeder 112. The seeder 112 produces a uniform spreading of seed along the belt 104. This is critical to maintain the maximum possible output of fodder. I.e., if the seed is not spread uniformly, then there will be areas where the fodder is too dense, and no individual sprout can get the resources needed to grow and areas where the seed is not dense enough, and there are not enough sprouts to take advantage of available resources. The proper density and depth of seed will depend on the type of fodder being grown, so the seeder must be configurable by the user, as described below.

FIG. 3 shows that the seeder 112 can include a box 302. The box 302 contains some or all of the seed that is to be distributed. I.e., the box 302 is a temporary holding place for the seed. The seed is removed from the box 302 through mechanisms, described below, which spread the seed on a grow bed or belt, such as the belt 104 of FIG. 1. Because the box 302 can be just a temporary holding place for the seed, it need not hold sufficient seed to fill the whole grow area.

FIG. 3 also shows that the seeder 112 can include an auger 304. The auger 304 distributes seeds within the box 302. The auger includes a rotating helical screw blade which acts as a screw conveyor to remove the seeds within the box 302. That is, the auger 304 is attached on both ends to the box 302 and rotates within the box 302 moving the seed to distribute the seed evenly.

FIG. 3 further shows that the seeder 112 can include a hopper 306. The hopper 306 is a place for holding seed to be placed in the box 302. I.e., the hopper 306 holds a larger amount of seed than the box 302. This allows a user to place large amount of seed for distribution, either in a single sitting or over multiple sittings. For example, the hopper 306 can be of sufficient size to hold enough seed to fill six beds, such as the beds 102 of FIG. 1, which would allow a user of a single fodder machine to fill the hopper once and then operate the fodder machine for a whole week.

The hopper 306 can be directly attached to the box 302, such that seed from the hopper 306 falls directly into the box 302, or can be indirectly attached, such that seed from the hopper passes through a hose or chute into a box 302. For example, when fodder machines are connected in a serial fashion, the amount of seed can become prohibitively heavy. That is, the weight of the hopper 206 would become so large, that the movement of the seeder 112 would be inhibited or could otherwise damage the seeder 112 and an indirect connection may be preferred. In contrast, if only a single fodder machine is being used then the weight of the seed is movable so a direct connection may be preferred so that loading is easier (the seeder 112 can be moved to a lower position to make adding to the hopper 306 easier, the seeder is then raised after seed is added).

FIG. 3 additionally shows that the seeder 112 can include an outlet 308. The outlet 308 allows seed to be distributed from the box 302. The outlet can include a passive mechanism such that seed simply falls through the outlet 308 when open or can include an active mechanism, such as a flywheel. I.e., the outlet 308 can be as simple as one or more openings that let seed fall from the box 302.

FIG. 3 moreover shows that the seeder 112 can include a vibration mechanism 310. The vibration mechanism 310 moves the outlet 308 such that seed continues to fall through the outlet 308. That is, with openings of the outlet 308 placed over the belt the vibration mechanism 310 and the auger 304 are activated and seed falls onto the belt. As the belt moves an even layer of seed is placed on the belt.

Figure 4:
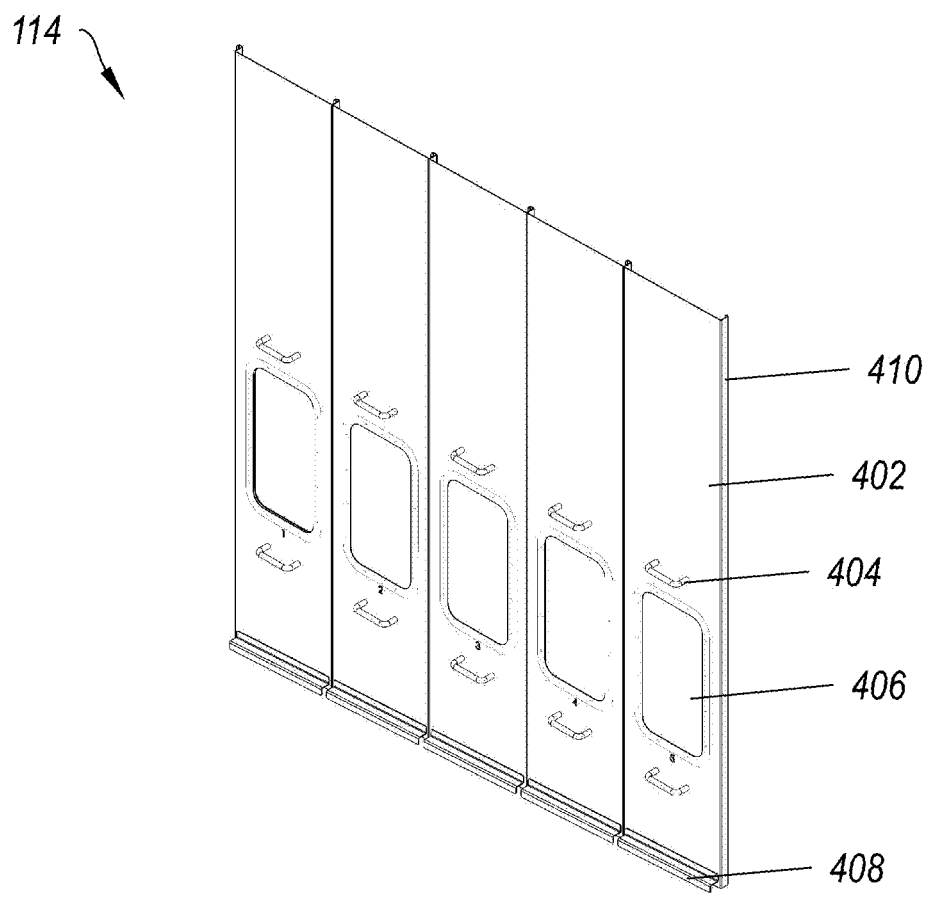
FIG. 4 illustrates an example of a slide.

FIG. 4 illustrates an example of a slide 114. The slide 114 allows fodder to be dropped off a belt or bed in a manner that does not damage or only permits minimal damage to the fodder. In particular, the slide 114 provides a surface down which the fodder can traverse to enter a collection area or conveyor system which can move the fodder to a desired location. In addition, the slide 114 is interlocking and configurable, to allow for conditions where the fodder machine is placed while containing mess and moisture from the fodder machine.

FIG. 4 shows that the slide 114 includes interlocking panels 402. The interlocking panels 402 allow the slide 114 to be made into any desired width, which is critical because each user may have different preferences for what to do with the fodder when done. In addition, because the interlocking panels 402 are made from stainless steel and/or other food grade material, the weight can be large and interlocking panels 402 allow the user to assemble on site.

FIG. 4 also shows that each of the interlocking panels 402 can include one or more handles 404. The one or more handles 404 allow the user to move the panels into or out of position, as desired. I.e., the handles 404 provide a way for the user to manipulate the panels into or out of position when needed.

FIG. 4 further shows that each of the interlocking panels 402 can include a window 406. The window 406 allows a user to evaluate the production process while still containing mess from the removal of fodder from the beds. In particular, the window 406 allows for easy visualization of fodder as it falls to the collection area or conveyor system.

FIG. 4 additionally shows that the interlocking panels 402 can include an attachment system 408. The attachment system 408 allows the interlocking panels 402 to be attached to the collection area. The attachment system 408 can be "L" shaped which allows the interlocking panels 402 to rest on the edge of the collection area and then tilt at an angle, which produces the sloped surface needed to control the descent of the fodder.

FIG. 4 moreover shows that the interlocking panels 402 can include a fastener 410. The fastener 410 allows each interlocking panel 402 to connect to adjacent interlocking panels 402. Because the fastener 410 on one side of any interlocking panel 402 could connect to the fastener 410 on the other side of the interlocking panel 402, each interlocking panel 402 can be connected in series to any other interlocking panel 402. This ensures that when being placed by the user, as many interlocking panels 402 as are needed can be placed. Further, the fastener 410 can include a portion which is "U" shaped which ensures that water cannot pass through the fastener 410, preventing water from passing through the slide 114.

Figure 5:
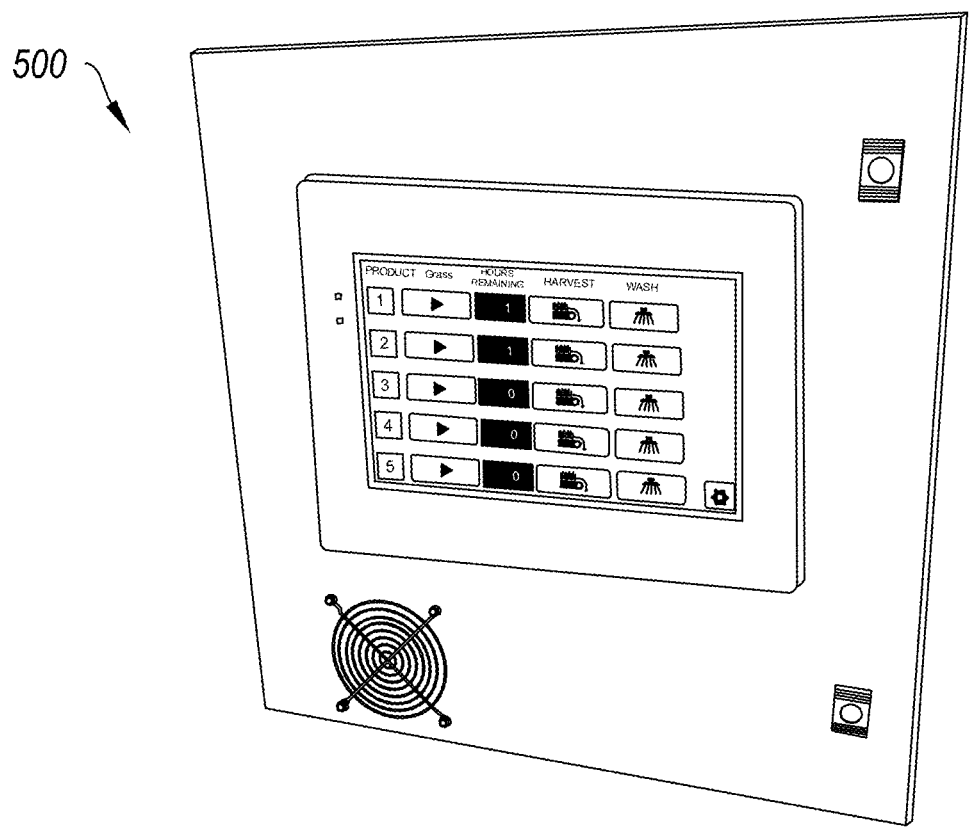
FIG. 5 illustrates an example of a user interface.

FIG. 5 illustrates an example of a user interface 500. The user interface 500 include control systems and software which controls the fodder machine. For example, the fodder machine can include software that automatically controls the movement of the beds when applying seed, watering schedules, lighting schedules, when to move beds for removal of the grown fodder, or any other aspect of the fodder growth.

In addition, the control systems can include sensors that detect one or more parameters to optimize growth. For example, the beds can have moisture sensors so that the watering can automatically occur when moisture levels in the fodder fall below a certain level, preventing both over- and under-watering. Likewise, sensors can be used to see the current growth of the fodder to optimize lighting conditions based on the life stage of the fodder.

Moreover, the control systems can include indicators for when an error occurs. For example, if a sensor determines that water is not being delivered when the water system is supposed to be on, the control systems can provide a visual, auditory, tactile or other warning to alert a user to the problem. The warning can indicate the problem and may list possible items to check or other fixes to the user.

Further, the control systems can include one or more cameras. The cameras allow a user to view the status of the fodder. For example, a user may see that the fodder is beginning to sprout and can then switch the control protocol to one that is more appropriate for seedlings, rather than more mature plants or seeds. Cameras are especially useful if the fodder machine is being operated in clean room fashion, as described below.

The control systems can be programmed based on the fodder being grown. For example, wheatgrass may have a different protocol that legumes. The control systems may also include customization available to the user. For example, if the user finds that growing conditions are optimized with less water because he/she is operating in an area with high humidity, then the user may be able to adjust watering as desired. The manual adjustment can come in the form of programs or adjustment to programs. For example, if the user is using a wheatgrass protocol then he/she may elect to increase or reduce watering by a certain percentage, allowing most functions to remain the same.

The software can be accessible through a control station, over the web, through a phone-based app, any other desired access or some combination of the above. For example, a phone app can have notifications that alert a user regardless of the user's position. I.e., the control software can detect a problem and push a notification to the user's phone, so that the user is aware of the problem even when not in proximity to the fodder machine.

The fodder machine can further include manual controls to override the control systems. For example, if the controls systems go offline, the manual controls can allow a user to turn on/off lighting, move beds, water plants, etc. to keep growing fodder while repairs are under way. For example, if the motor moving the beds becomes non-operational then the manual controls can allow a user to move the beds for the removal of fodder and/or for the addition of new seed. Thus, if the motor is not operation for 1-2 days, the fodder does not spoil and the growth of fodder remains on schedule to meet the user's needs.

Figure 6:
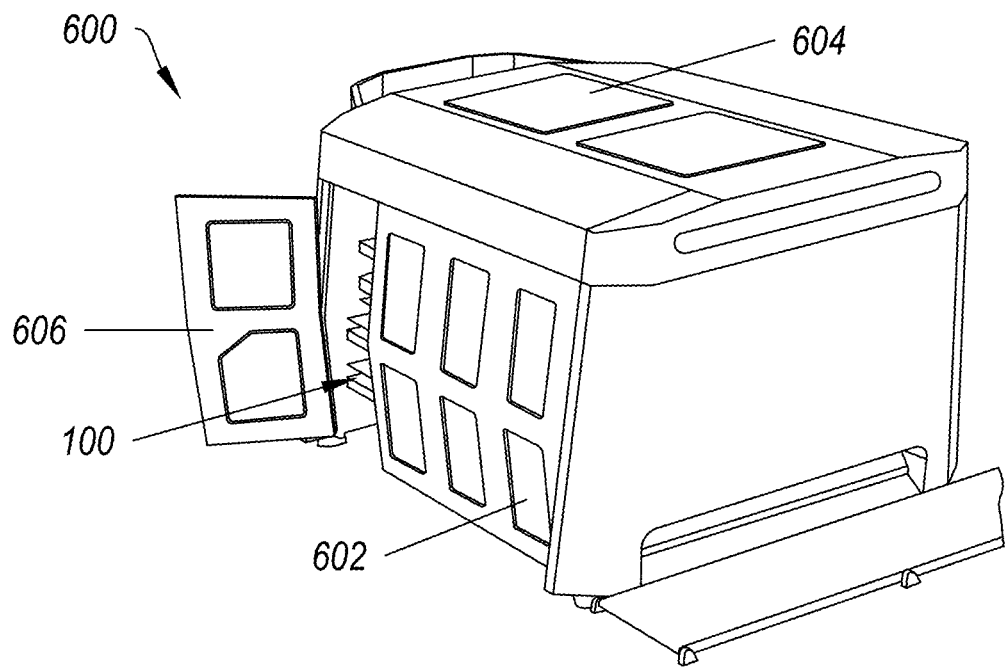
FIG. 6 illustrates an example of an enclosure for a fodder machine.

FIG. 6 illustrates an example of an enclosure 600 for a fodder machine 100. The enclosure 600 allows the fodder machine 100 to be operated partially or completely as a clean room. A cleanroom or clean room is a facility designed to maintain extremely low levels of particulates, such as dust, airborne organisms, or vaporized particles. Some principles of clean room operation include:

The air entering a cleanroom from outside is filtered to exclude dust, and the air inside is constantly recirculated through high-efficiency particulate air (HEPA) and/or ultra-low particulate air (ULPA) filters to remove internally generated contaminants.

Access is limited. Staff may be required to enter and leave through airlocks (sometimes including an air shower stage), and wear protective clothing such as hoods, face masks, gloves, boots, and coveralls.

Equipment inside the cleanroom is designed to generate minimal air contamination. Only special mops and buckets are used. Cleanroom furniture is designed to produce a minimum of particles and is easy to clean.

Common materials such as paper, pencils, and fabrics made from natural fibers are often excluded, and alternatives used. Cleanrooms are not sterile (i.e., free of uncontrolled microbes); only airborne particles are controlled. Particle levels are usually tested using a particle counter and microorganisms detected and counted through environmental monitoring methods. Polymer tools used in cleanrooms must be carefully determined to be chemically compatible with cleanroom processing fluids as well as ensured to generate a low level of particle generation.

Some cleanrooms are kept at a positive pressure so if any leaks occur, air leaks out of the chamber instead of unfiltered air coming in.

Some cleanroom HVAC systems control the humidity to such low levels that extra equipment like air ionizers are required to prevent electrostatic discharge problems.

Low-level cleanrooms may only require special shoes, with completely smooth soles that do not track in dust or dirt. However, for safety reasons, shoe soles must not create slipping hazards. Access to a cleanroom is usually restricted to those wearing a cleanroom suit.

In cleanrooms in which the standards of air contamination are less rigorous, the entrance to the cleanroom may not have an air shower. An anteroom (known as a "gray room") is used to put on clean-room clothing.

Some facilities do not use fully realized cleanrooms, but use some practices or technologies typical of cleanrooms to meet their contamination requirements.

The enclosure 600 may provide some of these benefits. For example, when raising crops that are prone to disease or attack by a particular pest (such as a particular fungus or insect) multiple enclosures 600 may be placed near one another so that even if one crop is contaminated, it is isolated form nearby crops and can be dealt with. I.e., the enclosure 600 allows for modularization that prevents the spread of pests. The amount of cleanroom principles applied can depend on the pest being controlled and risk of cross-contamination. For example, if the pest can only spread via water contamination, then air cleanliness may not be as important.

FIG. 6 shows that the enclosure 600 can include a window system 602. The window system allows visibility into the enclosure 600. For example, the window system 602 can include one-way glass that contains certain wavelengths within the enclosure 600. E.g., UV wavelengths may be reflected back into the enclosure 600 to protect users on the outside of the enclosure 600. Likewise, the glass may be tinted or otherwise reduce light levels, allowing the plants to receive the ideal amount of light without being harmful to users.

FIG. 6 also shows that the enclosure 600 can include one or more vents 604. The vents may be part of the widow system 602 or can be placed in the top or sides of the enclosure 600. The vents 604 can allow air exchange into and out of the fodder machine 100. This can be helpful in an area where there may be people and access to the plants should be restricted. For example, the enclosure 600 can be used to grow fresh herbs in a store. In such a scenario, the possibility of air contamination is low, but the access of customers may be restricted. Therefore, the vent 604 can allow air flow while protecting the plants from customers. Thus, all aspects of growing environment can be controlled, including humidity, temperature, etc. to maximize plant growth and minimize disease.

FIG. 6 further shows that the enclosure 600 can include a door 606. The door 606 allows a user to be in the immediate vicinity of the fodder machine 100. This allows for maintenance, checking on plant status, etc. In the case of herbs in a store, a user may harvest by hand since the demand will fluctuate over time, so the door 606 can be provided to allow for harvest when desired.

Figure 7:
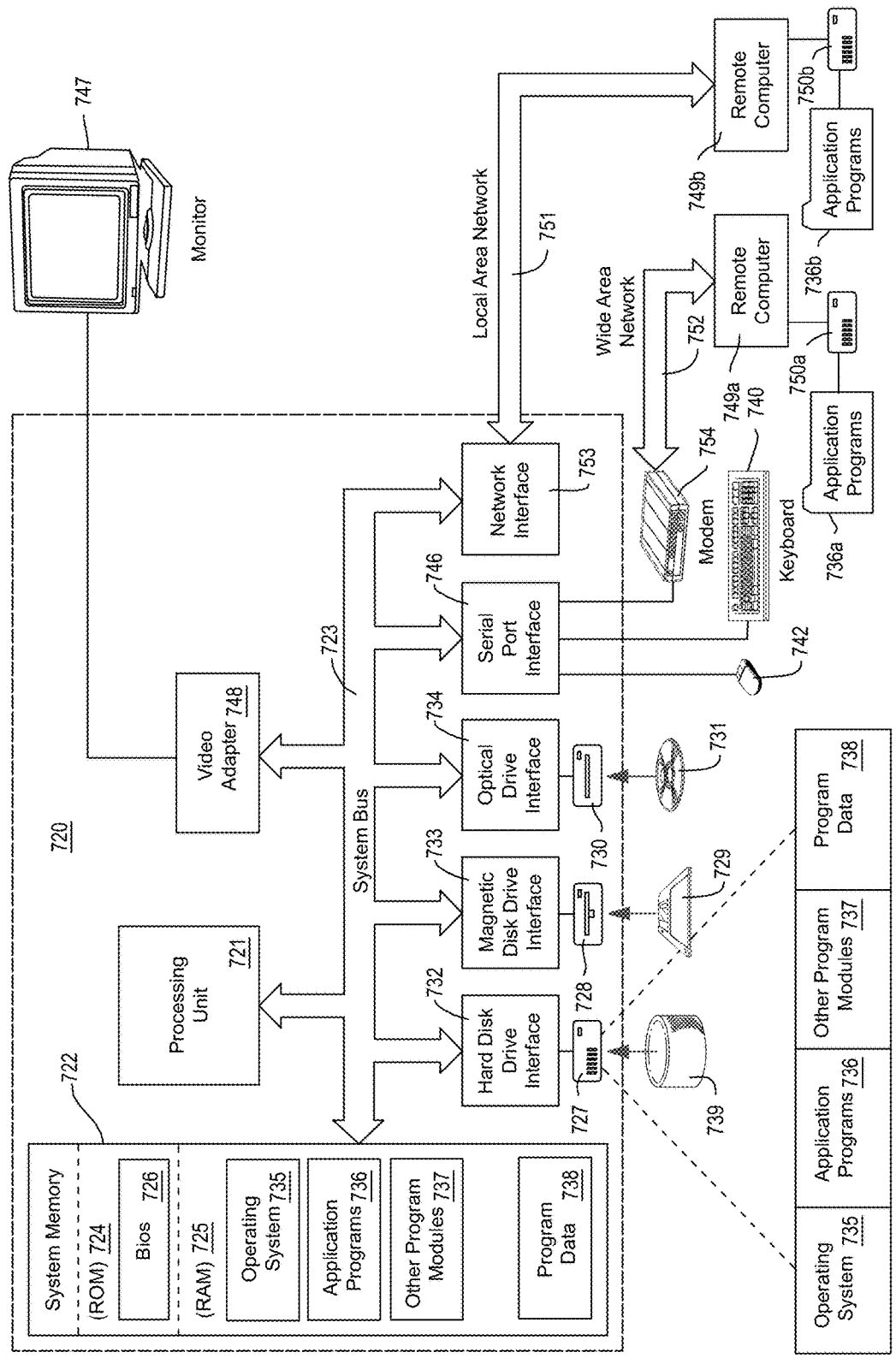
FIG. 7 illustrates an example of a suitable computing environment in which the invention may be implemented.

FIG. 7, and the following discussion, is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

One skilled in the art will appreciate that the invention may be practiced in network computing environments with many types of computer system configurations, including personal computers, hand-held devices, mobile phones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an example system for implementing the invention includes a general purpose computing device in the form of a conventional computer 720, including a processing unit 721, a system memory 722, and a system bus 723 that couples various system components including the system memory 722 to the processing unit 721. It should be noted however, that as mobile phones become more sophisticated, mobile phones are beginning to incorporate many of the components illustrated for conventional computer 720. Accordingly, with relatively minor adjustments, mostly with respect to input/output devices, the description of conventional computer 720 applies equally to mobile phones. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disc drive 730 for reading from or writing to removable optical disc 731 such as a CD-ROM or other optical media. The magnetic hard disk drive 727, magnetic disk drive 728, and optical disc drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disc 731, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 739, magnetic disk 729, optical disc 731, ROM 724 or RAM 725, including an operating system 735, one or more application programs 736, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 can be connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fodder machine, the fodder machine comprising:
one or more beds, wherein:
the one or more beds are vertical relative to one another;
each of the one or more beds is offset to every other bed in both horizontal directions; and
each of the one or more beds is tilted approximately two degrees from horizontal;
one or more belts, wherein the one or more belts:
are configured to be a surface for the growth of fodder; and
each include cleats along the belt, wherein each cleat includes one or more slots;
a paddle, wherein the paddle passes though each of the one or more slots in the cleats, clearing seed and fodder;
one or more first rollers, wherein each of the one or more first rollers is located on a first end of one of the one or more beds;
one or more second rollers, wherein each of the one or more second rollers is located on a second end of each of the one or more beds, wherein the second end is opposite the first end;
wherein each of the one or more belts is on one of the one or more beds passes over the first roller located on the first end of the bed and the second roller located on the second end of the bed and connects to itself;
a track on each of the one or more belts, wherein the track includes a protrusion that runs along the belt;
a notch on each of the one or more first rollers and each of the one or more second rollers, wherein the notch is configured to receive the track on the belt;
one or more motors, wherein each of the one or more motors is connected to one of the one or more first rollers;
a seeder, wherein the seeder is configured to:
output seed onto each of the one or more beds; and
move vertically between each of the one or more beds;
one or more troughs, wherein each of the one or more troughs is configured to receive all water drainage from one of the one or more beds;
a slide configured to receive the grown fodder;
a watering system configured to provide water to a surface of each bed, wherein the watering system includes:
a filtration system;
a grow light system configured to provide light to each bed;
control systems and software to control at least one of:
the one or more beds;
the seeder;
the watering system; or
the grow light system; and
an enclosure, the enclosure including:
a fully enclosed space, wherein the space is configured to receive each of:
the one or more beds;
the one or more belts;
the paddle;
the one or more first rollers;
the one or more second rollers;
the one or more motors;
the seeder;
the one or more troughs;
the slide;
the watering system; and
the grow light system;
one or more doors allowing access to the interior of the enclosed space;
one or more glass panels, wherein the one or more glass panels allow a user to see into the enclosed space; and one or more vents, wherein the one or more vents are configured to allow air flow between the fully enclosed space and an exterior of the enclosure.

2. The fodder machine of claim 1, wherein the seeder includes a hopper.

3. The fodder machine of claim 1, wherein the cleats are spaced approximately two feet apart.

4. The fodder machine of claim 1, wherein each of the one or more beds is constructed of stainless steel.

5. The fodder machine of claim 1, wherein the seeder is configured to distribute seed at about 30 inches per minute.

6. The fodder machine of claim 1, wherein the slide includes one or more interlocking panels.

7. The fodder machine of claim 1, wherein the slide includes one or more windows.

8. The fodder machine of claim 1, wherein the filtration system is configured to recycle water collected in the one or more troughs.

9. The fodder machine of claim 1, wherein the grow light system includes low heat lights.

10. The fodder machine of claim 1 further comprising a conveyor system, wherein the conveyor system transports the grown fodder after it falls down the slide.

11. The fodder machine of claim 1 wherein the one or more slots are placed approximately two feet apart from one another.

12. The fodder machine of claim 1 further comprising:
one or more windows, wherein the one or more windows are configured to provide access to the one or more beds.

13. The fodder machine of claim 1 further comprising:
a washing system, wherein the washing system is configured to clean the one or more belts after removal of the fodder.

* * * * *